Figures 1, 2:
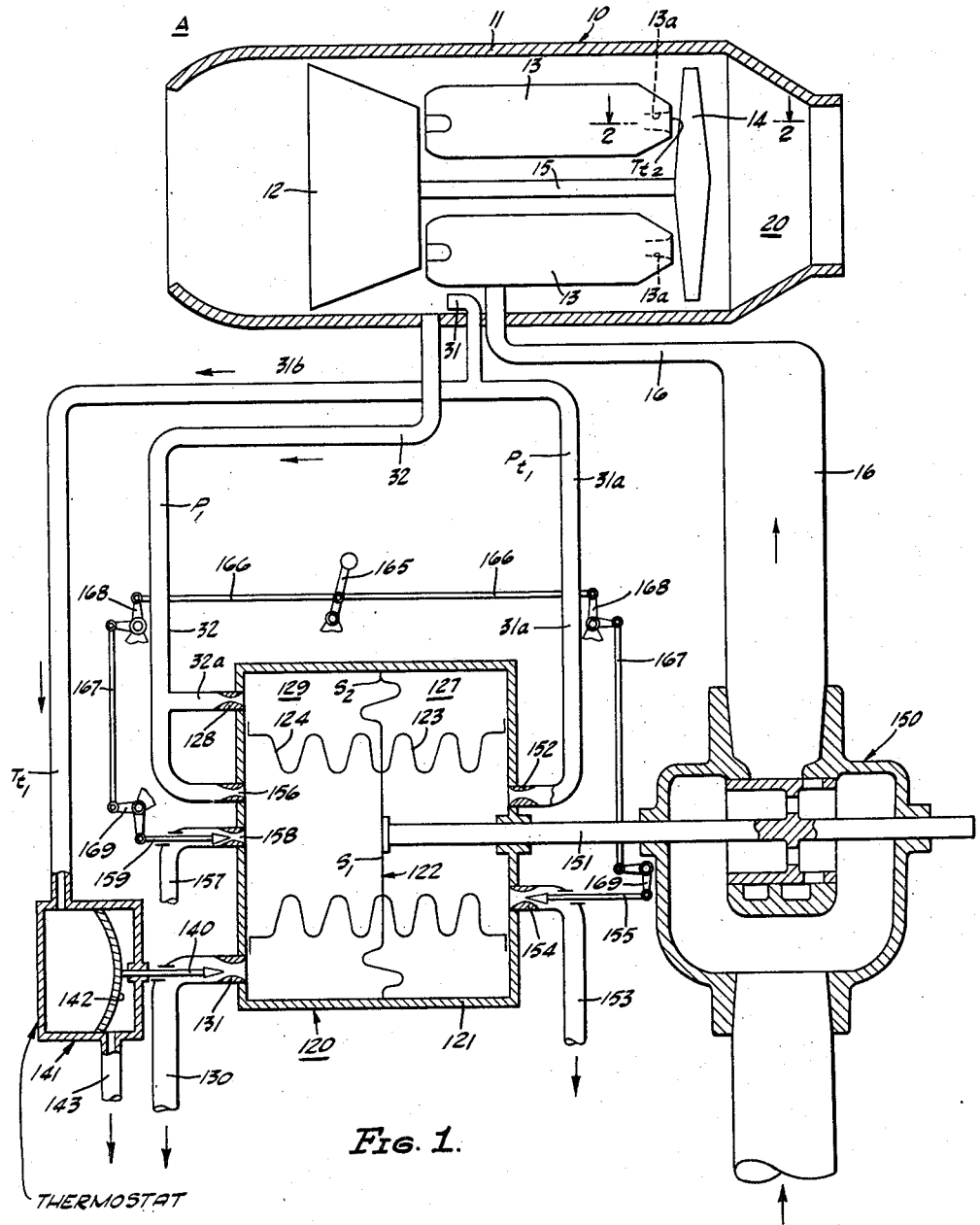

Oct. 28, 1958   J. A. DRAKE   2,857,742
TEMPERATURE CONTROL DEVICE FOR AN ENGINE
Original Filed Oct. 11, 1948

JOHN A. DRAKE
INVENTOR.

BY R. E. Geauque

ATTORNEY

United States Patent Office 2,857,742
Patented Oct. 28, 1958

2,857,742

TEMPERATURE CONTROL DEVICE FOR AN ENGINE

John A. Drake, Van Nuys, Calif., assignor to Marquardt Aircraft Company, Van Nuys, Calif., a corporation of California Original application October 11, 1948, Serial No. 53,791, now Patent No. 2,641,105, dated June 9, 1953. Divided and this application April 15, 1953, Serial No. 348,938

12 Claims. (Cl. 60—39.28)

This invention relates to a temperatue control system. More particularly, it relates to a temperature control system which is operable to control the turbine inlet temperature of a turbo-jet engine, or any other engine wherein heat is added to a working fluid in a combustion chamber, and wherein the duct venting the fluid from the combustion chamber is choked.

This invention will first be described with reference to a turbo-jet engine, and its applicability to other engines will be discussed thereafter. This application is a division of co-pending application, Serial No. 53,791 filed October 11, 1948, now Patent No. 2,641,105.

As is well known, a turbo-jet engine comprises an airframe within which is disposed a compressor, combustion chambers, a turbine, a shaft connecting the turbine and the compressor, and an exit nozzle. The outlets of the combustion chambers are choked, i. e., they are of convergent-divergent longitudinal section, so as to accelerate the gases at the turbine inlet. The turbine, besides driving the compressor, may also drive a propeller, and further work is obtained by venting the gases from the turbine through an exit nozzle to obtain a thrust.

In turbo-jet engines, temperature control of the turbine inlet is important, since if the temperature is allowed to rise above that which the construction materials of the turbine will withstand, the blades will burn off. But from the standpoint of jet efficiency, a high turbine inlet temperature should be maintained.

It is apparent that, to achieve maximum efficiency yet avoid mechanical failure, a temperature control system is required which is dependable and accurate, and which responds rapidly to changing conditions.

Systems employed heretofore have involved too great a time lag to be satisfactory, or have been inaccurate. Thus, in some cases the time lag has been such as to result in structural damage before the faulty condition has been corrected. Inaccuracies result from such phenomena as the velocity of flow past the thermal element used to measure the critical temperature, radiation from local hot spots, and variations of temperature across the critical region.

Such methods as have been used heretofore have measured the critical temperature more or less directly, resulting in the inaccuracies noted above. Direct measurement of temperature under the conditions prevailing at the inlet of a jet turbine is exceedingly difficult to carry out accurately and rapidly, and rapid translation of such measurement into a mechanical control is likewise exceedingly difficult.

It is an object of the present invention to provide an improved temperature control system for jet engines and other engines wherein heat is added to a working fluid in a combustion chamber and the heated fluid is vented through a choked duct.

Another object of the invention is to provide an indirect means of measuring temperatures in engines of the character described.

A further object of the invention is to provide means of measuring high temperatures at choked exit ducts, such as at the turbine inlet of a turbo-jet engine, without direct measurement of the temperature at such point, such means being accurate and involving very little time lag.

A still further object of the invention is to provide a temperature control device which is responsive to the pressure and temperature existing at the inlet of the combustion chamber and which does not require direct measurement of the turbine inlet temperature.

These, and other objects of the invention not specifically set forth above, will become readily apparent from the accompanying specification and drawings, in which Figure 1 is a schematic view of a conventional turbo-jet engine together with the control device of the subject invention and Figure 2 is a sectional view along line 2—2 of Figure 1 illustrating the combustion chamber nozzle.

The numeral 10 indicates generally, a turbo jet engine comprising an airframe 11, a compressor 12, combustion chambers 13, each having a choked or convergent-divergent nozzle 13a, a turbine 14, and a shaft 15 operatively connecting the turbine and compressor. A fuel inlet 16 connects with combustion chambers 13 and the nozzle section of the turbine is shown at 20. The turbo-jet 10 is also provided with a conduit 31 opening in an upstream direction adjacent the compressor outlet, and a conduit 32 also opening into the compressor outlet but in a direction transverse to the airstream shown. The purpose of conduits 31 and 32 is explained hereinafter. In the critical operating range, i. e., at high engine R. P. M., and at high turbine inlet temperature, the present invention makes it possible to measure the turbine inlet temperature indirectly by measuring two pressures and a low temperature.

In order to facilitate the discussion of this invention, certain terms are defined as follows:

$T_{t_2}$ is the total temperature at the turbine inlet; i. e., temperature as measured in an airstream when the air is brought to rest.

$T_{t_1}$ is the total temperature at the compressor outlet or combustion chamber inlet.

$P_{t_1}$ is the total pressure at the compressor outlet or combustion chamber inlet; i. e., pressure as measured through a duct opening into an airstream.

$P_1$ is the static pressure at the compressor outlet or combustion chamber inlet; i. e., pressure as measured transversely to an airstream.

$C$ is a constant.

Mathematically stated, the discovery set forth here in is as follows:

$$T_{t_2} \doteq \frac{T_{t_1} P_1}{P_{t_1} - P_1} \cdot C$$

That is, the total temperature at the turbine inlet ($T_{t_2}$) is measured by the temperature at the compressor outlet and by the static pressure and the total pressure at the compressor outlet. It will be noted that only the temperature quantity $T_{t_1}$ is measured, and this temperature is much lower and is much more easily measured than $T_{t_2}$, and thus, more accurate and quickly available results are obtainable.

The mechanical control system, illustrated in the figure, controls the fuel flow to the turbo-jet and solves the above equation. The terms of the equation have been applied in the drawing to the proper conduits.

A pressure-multiplying device 120 is provided, comprising a gas-tight chamber 121, and a flexible diaphragm 122 and bellows 123 and 124 are disposed therein as shown. The diaphragm is thus divided into a central area $S_1$ exposed to the interior of both bellows, and an annular area $S_2$ external to the bellows. The annular space 127 is evacuated and the bellows 123 communicates with a branch duct 31a, thus communicating a pressure $P_{t_1}$ to that bellows and to the diaphragm area $S_1$. Duct 32 communicates with bellows 124, thus communicating pressure $P_1$ to that bellows and to the opposite side of the diaphragm area $S_1$. It will thus be seen that a net force is applied to the diaphragm 122 which is equal to $P_{t_1}-P_1$.

A branch duct 32a, having a choked or convergent-divergent section 128 opens into the annular space 129, which is vented through a duct 130 having a choked or convergent-divergent section 131. A needle valve 140, which controls the throat area of the section 131, is actuated by a thermal expansive unit 141, comprising a metallic diaphragm 142 whose expansion and contraction are determined by the temperature $T_{t_1}$ by exposure to gas entering the unit through a duct 31b and leaving through a duct 143.

It will be apparent that the pressure in the annular space 129 will be proportional to $T_{t_1} \cdot P_1$. The diaphragm areas $S_1$ and $S_2$ are so chosen that, when the forces on the diaphragm are in balance, the following equation is satisfied:

$$(P_{t_1}-P_1)S_1 = T_{t_1} \cdot P_1 \cdot S_2$$

From this equation and the previously mentioned equation, it follows that:

$$T_{t_1} = \frac{T_{t_1} \cdot P_1}{P_{t_1}-P_1} = \frac{S_1}{S_2}C$$

As also shown in the figure, a valve 150 is provided in the fuel line 16 and is actuated, through a valve stem 151, by the diaphragm 122. It will, therefore, be apparent that, should $T_{t_2}$ drop below the desired value, the resulting unbalance of forces acting on the diaphragm 122 will open the valve 150 wider. Conversely, if $T_{t_2}$ exceeds the desired value, the valve 150 will be moved toward closed position. In either case, the fuel flow will be throttled to restore the system to the desired operating conditions.

Means is also provided for setting the control system of the figure at any desired value of $T_{t_2}$. Thus, as shown, duct 31a opens into bellows 123 through a convergent-divergent section 152 and a vent 153 is provided also having a convergent-divergent section 154, which is controlled by a needle valve 155. Similar means are provided for the bellows 124, as shown, including a choked section 156 in inlet duct 32, and an outlet duct 157 having a choked section 158 controlled by a needle valve 159. Both needle valves 155 and 159 are controlled by a control lever 165 through links 166, 167 and bell crank levers 168, 169, such that the needle valves 155 and 159 are moved together an equal amount to open or close the throats of the sections 154 and 158. It will be apparent that, by moving control lever 165, the force on diaphragm 122 (which is proportional to the value of $P_{t_2}-P_{t_1}$) will be varied. Thus, the lever 165 can be set to maintain the turbine inlet temperature, $T_{t_2}$, at any desired value.

There has been thus described a system for controlling turbine inlet temperature of a turbo-jet by automatic and indirect means. Other systems will be apparent to one skilled in the art, and it will also be apparent that the same principles and means are applicable in the case of any engine of the through-flow type, wherein heat is added to a working fluid, as by combustion in a combustion chamber, and the hot fluid is vented through a convergent-divergent or choked duct where it attains sonic velocity or a Mach number of unity.

It will, therefore, be apparent that the control system is applicable to a ram jet engine, to any gas turbine satisfying the criteria mentioned, and to all engines of the type mentioned whether useful work is taken in the form of thrust of a jet, as in the nozzle of a jet engine, or as the kinetic energy of a turbine, which may drive a propeller, wheels, etc. It will also be apparent that the temperature controlled, i. e., the temperature of gases from a choked exit duct of a combustion chamber, may have an optimum value varying within a wide range and dependent upon a particular set of circumstances. Also, instead of controlling such temperature by controlling the flow of fuel, it may be controlled by other means such as varying the exit nozzle of the engine, the pitch of a propeller or the back E. M. F. of a generator.

While the preferred form of this invention has been shown, it is to be understood that various changes may be made in its construction by those skilled in the art without departing from the spirit of the invention as defined in the appended claims.

What is claimed is:

1. A temperature control system for a through-flow engine of the type wherein a gaseous working fluid is taken into the inlet of combustion chamber means or the like, heat is added thereto and the hot fluid is accelerated to sonic velocity and vented through a choked outlet, said system comprising means for supplying fuel to said combustion chamber means, means for adjusting said fuel supply means to adjust the temperature of the fluid at said outlet and means for actuating said adjusting means, said actuating means being responsive only to total temperature and to static and total pressures of said fluid at said inlet.

2. A temperature control system for a through-flow engine of the type wherein a gaseous working fluid is taken into the inlet of combustion chamber means or the like, heat is added thereto and the hot fluid is accelerated to sonic velocity and vented through a choked outlet, said system comprising means for supplying fuel to said combustion chamber means, means for adjusting said fuel supply means to adjust the temperature of the fluid at said outlet and means for actuating said adjusting means, said actuating means exerting a force equal to a fraction of $T_{t_1} \cdot P_1 / P_{t_1} - P_1$, wherein $T_{t_1}$, $P_1$ and $P_{t_1}$ are total temperature, static pressure and total pressure, respectively, at said inlet.

3. A temperature control system for a turbo-jet engine having a compressor and a turbine connected together with a combustion chamber therebetween, comprising fuel supply means connected with said combustion chamber for regulating turbine inlet temperature and means for automatically adjusting said fuel supply means in response to variation of conditions in the engine, said adjusting means comprising pressure responsive means responsive to total and static pressures at the compressor outlet and temperature responsive means connected to said pressure responsive means and responsive to the compressor outlet temperature.

4. A control system for a turbo-jet engine having in flight a compressor outlet temperature of $T_{t_1}$, compressor outlet total and static pressures of $P_{t_1}$ and $P_1$, and a turbine inlet total temperature of $T_{t_2}$, said system comprising means responsive to $P_{t_1}$ and $P_1$, and exerting a first force proportional to $P_{t_1}-P_1$, means responsive to $T_{t_1}$ and $P_1$, and exerting a second force proportional to $T_{t_1} \cdot P_1$, and means for dividing said second force by said first force to obtain a force proportional to $T_{t_1}$.

5. In a temperature control system for a through-flow engine wherein heat is added in a combustion chamber to a gaseous working fluid and the hot fluid is vented at sonic velocity, first pressure means for providing a force representing the difference between the static and total pressure at the combustion chamber inlet and second pressure means for providing a force representing the product of said static pressure and combustion chamber inlet total temperature, said first and second means being connected together to provide a control force proportional to combustion chamber outlet total temperature.

6. In a temperature control system for a through-flow engine wherein heat is added in a combustion chamber to a gaseous working fluid and the hot fluid is vented at sonic velocity, means for measuring the static pressure at the combustion chamber inlet, means for measuring the total pressure at the combustion chamber inlet, means responsive to said static and total pressures for providing a first force proportional to the difference in said two pressures, means responsive to the total temperature at the combustion chamber inlet for modifying said static pressure to provide a second force proportional to the product of said static pressure and said temperature and means for dividing said second force by said first force to obtain a force proportional to combustion chamber outlet total temperature.

7. In a temperature control system for a through-flow engine wherein heat is added in a combustion chamber to a gaseous working fluid and the hot fluid is vented at sonic velocity, a diaphragm divided into first and second areas, means for transmitting the static pressure at the combustion chamber inlet to one side of said first area, means for transmitting the total pressure at the combustion chamber inlet to the other side of said first area, means for introducing said static pressure to one side of said second area and means responsive to total temperature at the combustion chamber inlet for varying the static pressure on said one side of said second area in accordance with said temperature, the other side of said second area being evacuated.

8. In a temperature control system as defined in claim 7 having a fuel valve for controlling fuel flow to said combustion chamber and means for connecting said fuel valve to said diaphragm.

9. In a temperature control system as defined in claim 7 wherein each side of the first area of said diaphragm is vented to atmosphere through a convergent-divergent section and manually controlled valve means in each of said sections for varying the pressure on each side of said first area.

10. In a turbine inlet temperature control system for a turbo-jet engine having a compressor, a turbine, and a combustion chamber positioned therebetween, first pressure means for providing a force representing the difference between the static and total pressure at the compressor outlet and second pressure means for providing a force representing the product of said static pressure and compressor outlet total temperature, said first and second means being connected together to provide a control force proportional to turbine inlet temperature.

11. In a temperature control system for a turbo-jet engine having a compressor, a turbine and a combustion chamber positioned therebetween, means for measuring the static pressure at the compressor outlet, means for measuring the total pressure at the compressor outlet, means responsive to said static and total pressures for providing a first force proportional to the difference in said pressures, means rseponsive to the total temperature at the compressor outlet for modifying said static pressure to provide a second force proportional to the product of said static pressure and said temperature, and means for dividing said second force by said first force to obtain a force proportional to the total temperature at the turbine inlet.

12. A temperature control system for a through-flow engine wherein heat is added in a combustion chamber to a gaseous working fluid and the hot fluid is vented at sonic velocity, comprising a fuel passage connected with said combustion chamber, regulating means for controlling fuel flow through said fuel passage, first pressure means for providing a force representing the difference between the static and total pressure at the combustion chamber inlet and second pressure means for providing a force representing the product of said static pressure and combustion chamber inlet total temperature, said first and second means being connected together to provide a control force for positioning said regulating means and controlling the combustion chamber outlet total temperature.

References Cited in the file of this patent

UNITED STATES PATENTS

| | | |
|---|---|---|
| 1,102,345 | Lemale | July 17, 1914 |
| 2,441,948 | Atkinson | May 25, 1948 |
| 2,457,595 | Orr | Dec. 28, 1948 |
| 2,545,703 | Orr | Mar. 20, 1951 |
| 2,566,319 | Deacon | Sept. 4, 1951 |
| 2,641,105 | Drake | June 9, 1953 |
| 2,667,743 | Lee | Feb. 2, 1954 |